(12) United States Patent
Shinoda (10) Patent No.: US 11,868,190 B2
(45) Date of Patent: Jan. 9, 2024

(54) DISPLAY DEVICE AND POWER SUPPLY METHOD

(71) Applicant: Sharp NEC Display Solutions, Ltd., Tokyo (JP)

(72) Inventor: Akira Shinoda, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 65 days.

(21) Appl. No.: 17/630,268

(22) PCT Filed: Jul. 31, 2019

(86) PCT No.: PCT/JP2019/030062
§ 371 (c)(1),
(2) Date: Jan. 26, 2022

(87) PCT Pub. No.: WO2021/019739
PCT Pub. Date: Feb. 4, 2021

(65) Prior Publication Data
US 2022/0276686 A1  Sep. 1, 2022

(51) Int. Cl.
*G06F 1/26* (2006.01)
*G06F 13/38* (2006.01)
(Continued)

(52) U.S. Cl.
CPC ............. *G06F 1/266* (2013.01); *G06F 1/28* (2013.01); *G06F 1/3218* (2013.01);
(Continued)

(58) Field of Classification Search
CPC . G06F 1/263; G06F 1/266; G06F 1/28; G06F 1/30; G06F 1/305; G06F 1/3206;
(Continued)

(56) References Cited

U.S. PATENT DOCUMENTS

| | | | |
|---|---|---|---|
| 9,619,979 B1* | 4/2017 | Montero | ................. H04L 69/03 |
| 2007/0097428 A1* | 5/2007 | Yamada | ............. H04N 1/00278 |
| | | | 358/1.15 |

(Continued)

FOREIGN PATENT DOCUMENTS

| | | |
|---|---|---|
| JP | 2015-095133 A | 5/2015 |
| JP | 2017-099152 A | 6/2017 |

(Continued)

OTHER PUBLICATIONS

International Search Report (ISR) (PCT Form PCT/ISA/210), in PCT/JP2019/030062, dated Oct. 21, 2019.

*Primary Examiner* — Thomas J. Cleary
(74) *Attorney, Agent, or Firm* — McGinn I.P. Law Group, PLLC (57) ABSTRACT

One aspect of a display device of the present invention is a display device having a liquid crystal panel and a power lamp. The display device includes: a control unit that controls a display of the liquid crystal panel based on a power supplied from an external device and controls a lighting of the power lamp based on a reference voltage; a first switch that supplies, the power to the control unit, the power being supplied from the external device via a predetermined connector; a voltage detection circuit that generates the reference voltage; a second switch that supplies the (Continued)

reference voltage to the power lamp and the control unit; and a second control unit that determines whether or not the power meets a condition for establishing negotiation with the external device, and turns on one of the first switch and the second switch according to a result of the determination.

10 Claims, 8 Drawing Sheets

(51) Int. Cl.
    *G06F 1/28*      (2006.01)
    *G06F 1/3234*      (2019.01)
    *G06F 11/30*      (2006.01)
    *G06F 11/32*      (2006.01)
    *G06F 1/3218*      (2019.01)

(52) U.S. Cl.
    CPC ........ *G06F 1/3265* (2013.01); *G06F 11/3055* (2013.01); *G06F 11/325* (2013.01); *G06F 13/382* (2013.01); *G06F 2213/0042* (2013.01)

(58) Field of Classification Search
    CPC .... G06F 1/3215; G06F 1/3218; G06F 1/3265; G06F 3/00; G06F 11/3055; G06F 11/324; G06F 11/325; G06F 13/38; G06F 13/382; G06F 2213/0042
See application file for complete search history.

(56) References Cited

U.S. PATENT DOCUMENTS

| | | | |
|---|---|---|---|
| 2013/0335010 A1* | 12/2013 | Wu | H02J 7/0071 320/107 |
| 2014/0156879 A1* | 6/2014 | Wong | G06F 11/3055 710/19 |
| 2014/0375249 A1* | 12/2014 | Xiang | H02J 7/0048 320/149 |
| 2017/0093095 A1* | 3/2017 | Chin | H01R 13/717 |
| 2018/0059750 A1* | 3/2018 | Kaechi | H02J 7/342 |
| 2018/0062218 A1* | 3/2018 | Kaechi | H02J 7/007182 |
| 2018/0226756 A1* | 8/2018 | Chen | H01R 24/62 |
| 2019/0064899 A1 | 2/2019 | Doi et al. | |
| 2019/0104586 A1* | 4/2019 | Yu | H02J 7/0029 |
| 2020/0241614 A1* | 7/2020 | Sultenfuss | G06F 1/189 |
| 2023/0017285 A1* | 1/2023 | Shinoda | H02M 3/157 |

FOREIGN PATENT DOCUMENTS

| | | |
|---|---|---|
| JP | 2019-046066 A | 3/2019 |
| JP | 2019-121963 A | 7/2019 |

* cited by examiner

DISPLAY DEVICE AND POWER SUPPLY METHOD

TECHNICAL FIELD

The present invention relates to a display device and a power supply method.

BACKGROUND ART

In recent years, there are an increasing number of systems in which an external device (source device) is connected to a display device (sink device) using a USB (Universal Serial Bus) Type-C connector (hereinafter referred to as a USB connector) to supply power from the external device to the display device (see, for example, Patent Document 1, for the connection between the source device and the sink device).

Here, the source device and the sink device are related to the power supply performed between a plurality of electronic devices, and it is assumed that an electronic device that supplies power is the source device, and an electronic device that is supplied with the power is the sink device.

As described above, the display device and the external device are connected using the USB cable, the external device supplies power (voltage/current), and the display device performs panel display using the power (voltage/current determined by negotiation) supplied from the external device.

Here, the negotiation is a process, in USB Power Delivery (power supply by a USB Type-C connector), of performing transmission and reception of information on compatible power (voltage/current) which is performed by the USB protocol between the source device and the sink device and determining power (voltage/current) to supply or be supplied. Then, the power supply is started by the determined power (voltage/current).

For example, when 45 W or more is required as a condition for driving a monitor (for the display device to perform the panel display using the voltage/current determined by the negotiation), a power supply of 20V/2.25 A or more is required. According to the USB Type-C PD standard, 3 A (MAX) is set under the setting of 5V/9V/15V, so that the monitor side will output a request for 20V by the USB Type-C negotiation. Here, in the case of 20V, up to 100W is supportable according to the USB Type-C PD standard.

CITATION LIST

Patent Document

[Patent Document 1] Japanese Patent Application Publication No. 2019-046066

[Patent Document 2] Japanese Patent Application Publication No. 2017-099152

SUMMARY OF THE INVENTION

Problems to be Solved by the Invention

However, there are cases where the display device cannot perform the panel display using the power supplied from the external device (USB PD becomes abnormal). as shown in the following three examples (1) to (3).

(1) When a conversion adapter or cable from a USB Type-A connector is interposed.

Since USB Type-C negotiation cannot be performed, VBUS of USB 1.0/2.0 will only supply 5V, resulting in the lack of power supply under 5V/900 mA (4.5 W) MAX.

(2) When an AC adapter/battery or the like is not compatible with 45 W or more

This is a case where 20V is not supported while the USB Type-C PD is supported, or a case of 45 W or less. In this case, USB Type-C negotiation is supported, but the output on the supply side is rejected, so that VBUS is not outputted.

(3) When a voltage of a USB Type-C compatible AC adapter/battery drops

This is a case where the voltage of VBUS determined by negotiation becomes insufficient due to draining of the battery or deterioration of the AC adapter. In this case, since 19V is the lower limit of 20V according to the USB Type-C PD standard, depending on a Type-C controller IC inside a monitor (display device), a low voltage may work so that the VBUS supply may be stopped in some cases.

Here, the VBUS is the voltage supplied to the inside of the monitor (display device).

Due to the factors that cause the abnormality of the USB PD described in above (1) to (3), the monitor (display device) outputs no image, thereby causing a problem that the user erroneously determines a failure of the monitor.

Therefore, when a screen of the monitor (display device) does not appear due to factors such that products (power supply side) are not USB Type-C compatible, the user mistakes it as a failure on the monitor side. This causes a problem that when a screen does not appear due to a failure on the power supply side (source device), it is necessary to enable the monitor (sink device) to identify the power reception abnormality of the USB PD (power delivery).

An object of the present invention is to provide a display device and a power supply method capable of solving the above problems.

Here, Patent Document 2 describes a technique in which when a voltage of a battery 90 is detected to be low, a switch 42 of a power supply unit 57 is turned off, so that the power of a power reception device is turned off through the control unit 54 (see FIG. 4B of Patent Document 2).

Similar to the above problems, however, there is a possibility, as a problem, that the user does not receive a message due to the low battery and therefore will mistake it for a failure of the power reception device.

For this reason, in order to not only detect a voltage (VBUS), but also notify a decrease of a battery or the like, the invention of the present application has a configuration in which a monitor (display device) is provided with an LED or the like to notify the user of a low battery or insufficient voltage.

Further, Patent Document 2 has a configurational difference from the present invention such that the USB Type-C PD as the control unit does not support the voltage of 20V (Vcc) and does not perform the USB Type-C control.

Means for Solving the Problems

In order to solve the above problems, one aspect of the present invention is a display device having a liquid crystal panel and a power lamp. The display device includes: a control unit that controls a display of the liquid crystal panel based on a power supplied from an external device and controls a lighting of the power lamp based on a reference voltage; a first switch that supplies the power to the control unit, the power being supplied from the external device via a predetermined connector; a voltage detection circuit that generates the reference voltage; a second switch that supplies the reference voltage to the power lamp and the control unit; and a second control unit that determines whether or not the power meets a condition for establishing negotiation with the external device, and turns on one of the first switch and the second switch according to a result of the determination.

Additionally, one aspect of the present invention is a power supply method of a display device having a liquid crystal panel and a power lamp, the display device comprising: a control unit that controls a display of the liquid crystal panel based on a power supplied from an external device and controls a lighting of the power lamp based on a reference voltage; a first switch that supplies the power to the control unit, the power being supplied from the external device via a predetermined connector; a voltage detection circuit that generates the reference voltage; a second switch that supplies the reference voltage to the power lamp and the control unit; and a second control unit, wherein the second control unit determines whether or not the power meets a condition for establishing negotiation with the external device, and turns on one of the first switch and the second switch according to a result of the determination.

Effects of the Invention

According to one aspect of the present invention, when a screen does not appear due to a defect on the power supply side (external device which is the source device), it is possible to identify the power reception abnormality of the USB PD (power delivery) on the monitor (display device which is the sink device).

BRIEF DESCRIPTION OF THE DRAWINGS

FIG. 1 is a block diagram showing a configuration example of a conventional display device 10a.

MODE FOR CARRYING OUT THE INVENTION

Hereinafter, conventional display devices, their problems, and embodiments of the present invention will be sequentially described with reference to the drawings.

Conventional Display Devices and Their Problems

Figure 1:
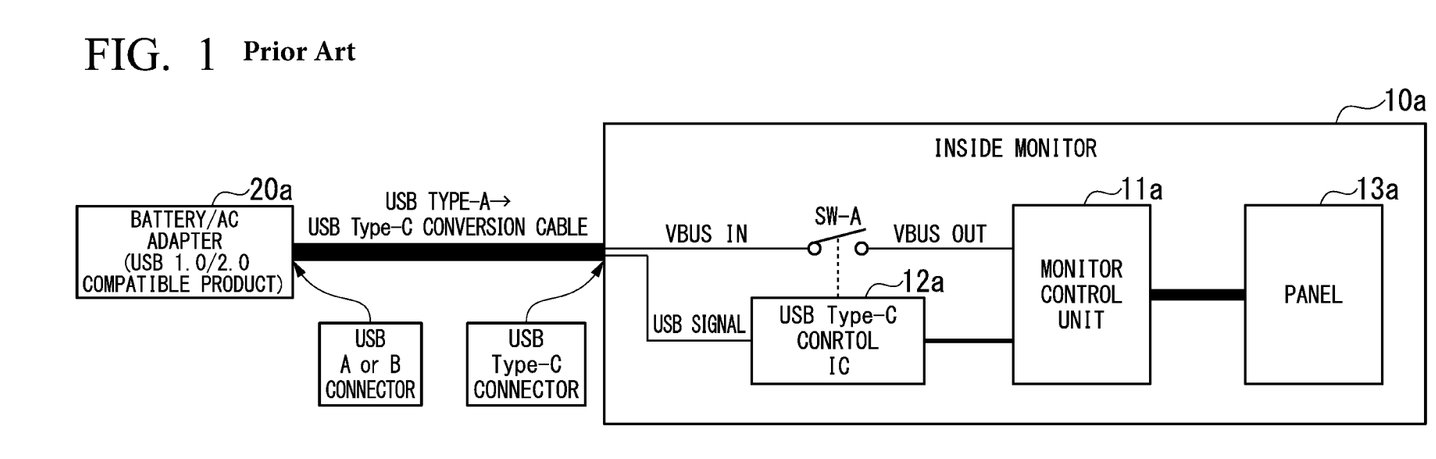

First, FIG. 1 is a block diagram showing a configuration example of a conventional display device 10a.

FIG. 1 shows an example in which an external device 20a is connected to the display device 10a via a conversion adapter or cable from a USB_A connector.

Here, the display device 10a includes a monitor control unit 11a, a USB Type-C control IC 12a, a panel 13a, and a USB Type-C connector. Further, the external device 20a is a USB 1.0/2.0 compatible product and has a battery and an AC adapter.

As shown in FIG. 1, even when the USB 1.0/2.0 source device (external device 20a) is inserted into the "USB Type-C" connector of the monitor (display device 10a), power (power) cannot be supplied to the monitor control unit 11a due to the inability to negotiate with the USB Type-C control IC 12a, so that the monitor does not perform panel display.

At this time, since the negotiation of the USB Type-C control IC 12a is not established, a switch SW-A also continues to be in an off state. Therefore, a voltage value of VBUS IN in the figure is 5V, and a voltage value of VBUS OUT is no voltage (0V).

That is, the monitor control unit 11a cannot control the display of the panel 13a.

Figure 2:
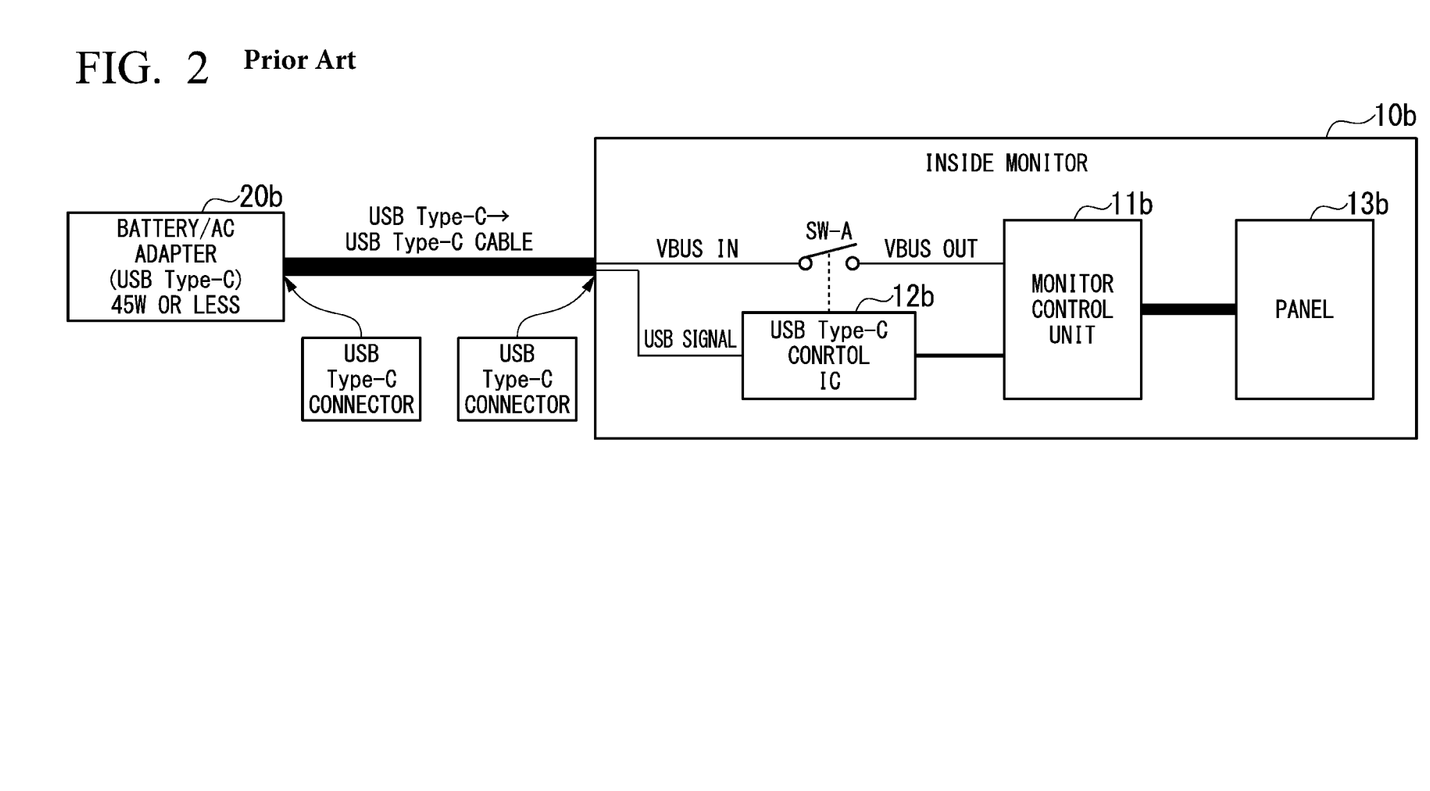
FIG. 2 is a block diagram showing a configuration example of a conventional display device 10b.

Next, FIG. 2 is a block diagram showing a configuration example of the conventional display device 10b.

FIG. 2 shows an example in which an external device 20b including an AC adapter/battery or the like that is incompatible with 45 W or more is connected to the display device 10b.

Here, the display device 10b includes a monitor control unit 11b, a USB Type-C control IC 12b, a panel 13b, and a USB Type-C connector. Further, the external device 20b has a battery and an AC adapter (products that do not support 45 W or more).

As shown in FIG. 2, in a case where the USB Type-C PD compatible source device (external device 20b) is less than 45 W, even when the external device 20b is inserted into a "USB Type-C" connector of the monitor (display device 10b), USB Type-C negotiation is not established, power (power) is not supplied to the monitor control unit 11b, so that the monitor does not perform panel display.

At this time, since the negotiation of the USB Type-C control IC 12b is not established, the switch SW-A also continues to be in the off state.

Here, "negotiation is not established" means that when the monitor is negotiated, the monitor side requests the power of 20V/2.25A or more, and the power of 45 W or more cannot be supplied from the source device, so that the negotiation is not established.

Therefore, a voltage value of VBUS IN in the figure is 5V/9V/15V/20V, and a voltage value of VBUS OUT is no voltage (0V) or 5V as requested by negotiation.

That is, the monitor control unit 11b cannot control the display of the panel 13b.

Figure 3:
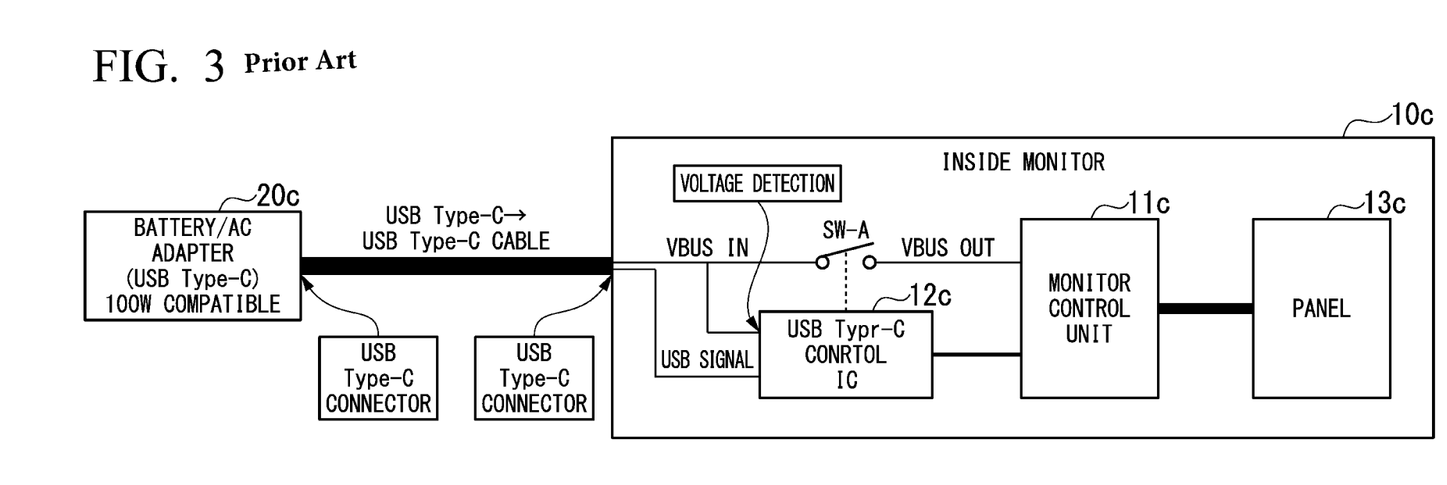
FIG. 3 is a block diagram showing a configuration example of a conventional display device 10c.

Next, FIG. 3 is a block diagram showing a configuration example of a conventional display device 10c.

FIG. 3 shows an example in which an external device 20c including an AC adapter/battery or the like that is compatible with 100 W is connected to the display device 10c, and a voltage of the AC adapter/battery in the external device 20c drops.

Here, the display device 10c includes a monitor control unit 11c, a USB Type-C control IC 12c, a panel 13c, and a USB Type-C connector. Further, the external device 20c has a battery and an AC adapter (products that support 100 W).

As shown in FIG. 3, in a case where the USB Type-C PD compatible source device (external device 20c) is 100 W, when the external device 20c is inserted into the "USB Type-C" connector of the monitor (display device 10c), USB Type-C negotiation is established, so that power (power) is supplied to the monitor control unit 11c, so that the monitor performs panel display.

At this time, since the negotiation of the USB Type-C control IC 12c is established, the switch SW-A shifts from the off state to an on state.

Here, "negotiation is established" means that when the monitor is negotiated, the monitor side requests the power of 20V/2.25 A or more, and the power of 100 W can be supplied from the source device, so that the negotiation is established.

Therefore, a voltage value of VBUS IN in the figure is 20V, and a voltage value of VBUS OUT is 20V as requested by the negotiation.

That is, the monitor control unit 11b can control the display of the panel 13c.

However, when the voltage of the USB Type-C PD compatible source device drops, the monitor screen suddenly blacks out. This is an example of a case where a voltage drop due to long-term use when the battery is used, a shortage of allowable power the AC adapter, and the like are the factors.

As described above, due to the factors of the external devices 20a to 20c described with reference to FIGS. 1 to 3, symptoms, such that a screen of the monitor (display devices 10a to 10c) does not appear or disappear, occur, thereby causing a problem that the user mistakes it for a failure of the monitor.

Here, to repeat the above contents, an operation example of the display devices 10a to 10c connected to the external devices 20a to 20c (here, if necessary, they are referred to as an external device 20x and a display device 10x, and "x" is appended to the reference signs of the respective circuits constituting the display device 10x) will be described with reference to the drawings.

Figure 4:
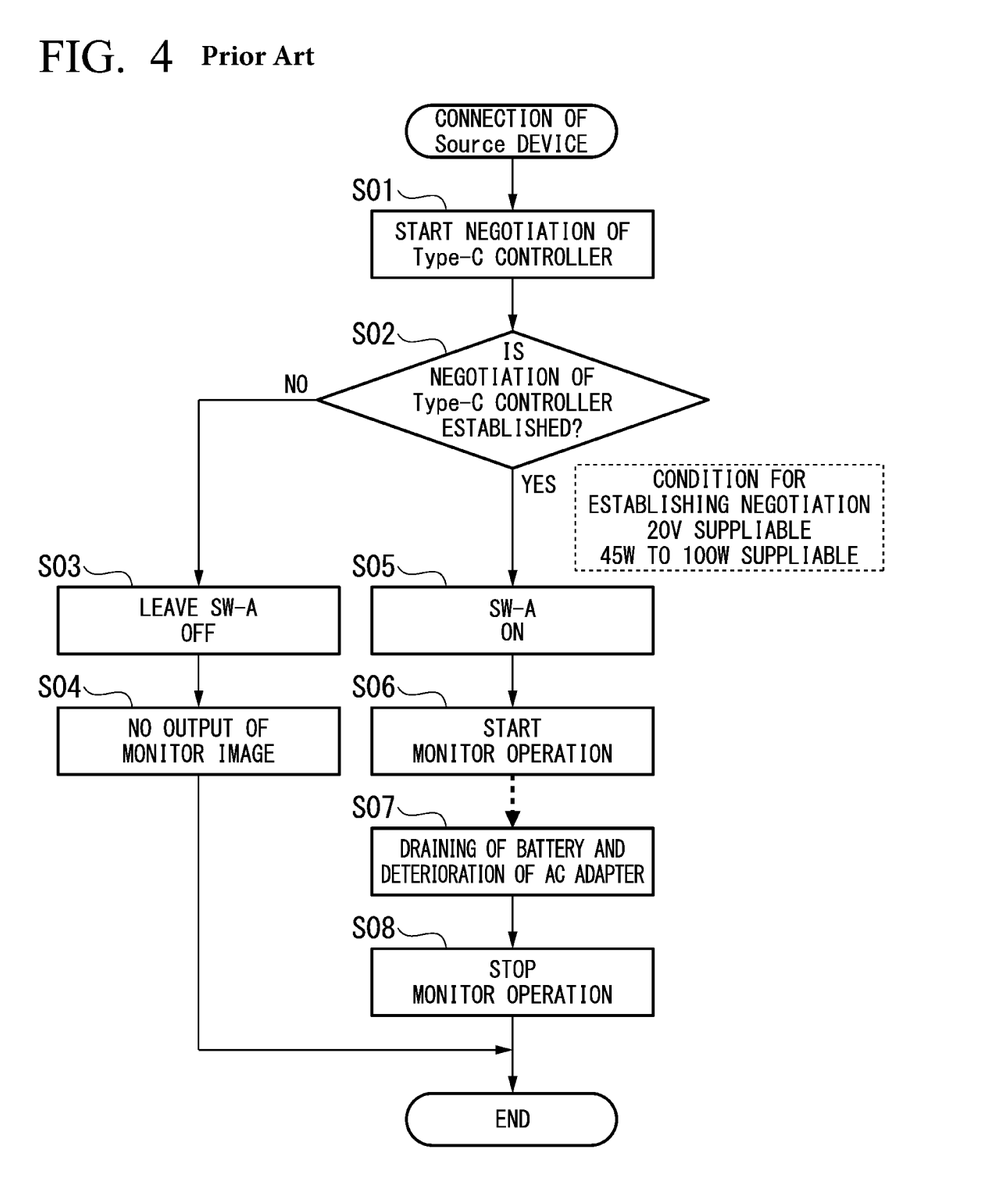
FIG. 4 is a flowchart showing an operation example of the conventional display devices 10a, 10b, and 10c.

FIG. 4 is a flowchart showing an operation example of the conventional display device 10x.

When a source device is connected, negotiation of the Type-C controller starts (step S01).

Specifically, when the external device 20x and the display device 10x are connected, the negotiation of the Type-C controller IC 12x in the display device 10x with the external device 20x starts.

The Type-C controller determines whether or not the negotiation has been established (step S02). Here, a condition for establishing the negotiation is that the external device 20x can supply the voltage of 20V and can supply the power of 45 W to 100 W.

Therefore, if a determination result at this step is No (step S02-No), the display devices 10a and 10b connected to the external devices 20a and 20b proceed to step S03, and if Yes (step S02-Yes), the display device 10c connected to the external device 20c proceeds to step S05.

SW-A is left off (step S03).

Specifically, the Type-C controller IC 12x in the display device 10x maintains the switch SW-A in the off state.

It enters a state of no output of monitor images (step S04).

Specifically, since the switch SW-A in the display device 10x is in the off state, VBUS OUT is not supplied to the monitor control unit 11x, so that the display of the panel 13x cannot be controlled.

SW-A is turned on (step S05).

Specifically, the Type-C controller IC 12c in the display device 10c causes the switch SW-A to shift from the off state to the on state.

Monitor operation starts (step S06).

Specifically, since the switch SW-A in the display device 10a is turned on, VBUS OUT is supplied to the monitor control unit 11a, so that the display of the panel 13a can be started.

Draining of the battery and deterioration of the AC adapter occur (step S07).

Specifically, the battery in the external device 20a drains or the AC adapter deteriorates.

The monitor operation is stopped (step S08).

Specifically, VBUS OUT is no longer supplied to the monitor control unit 11a of the display device 10a, so that the display of the panel 13a is stopped.

With the operation of the above flowchart, it can be said that even a problem of the source device (external device 20x) is mistaken for a failure of the monitor (display device 10x).

Therefore, it is an issue in the embodiment of the present invention to make it possible to identify power reception abnormality of the USB PD (power delivery) on the monitor (sink device) when a screen does not appear due to a defect on the power supply side (source device).

EMBODIMENT OF THE PRESENT INVENTION

Figure 5:
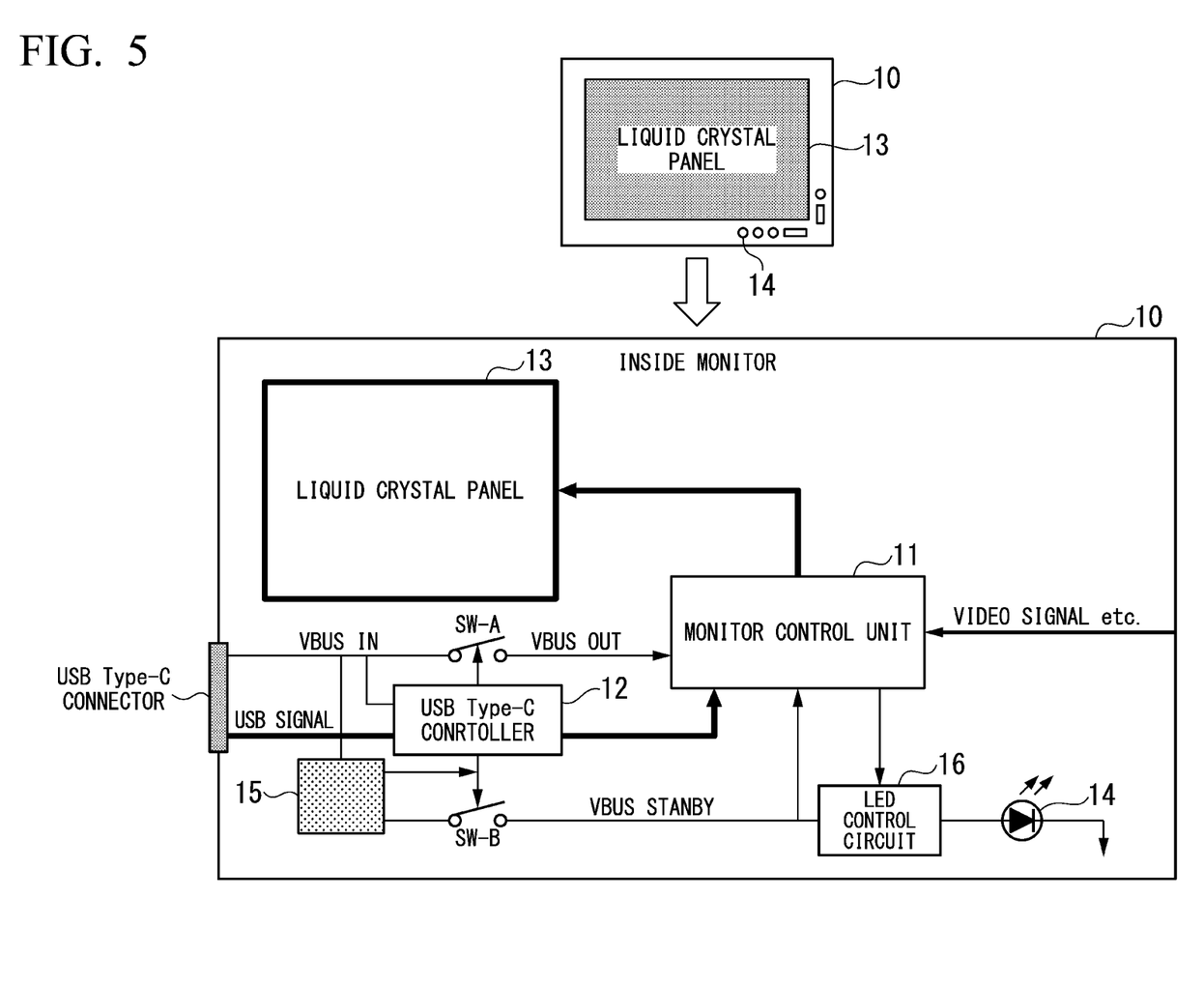
FIG. 5 is a block diagram showing a configuration example of a display device 10 according to an embodiment of the present invention.

FIG. 5 is a block diagram showing a configuration example of a display device 10 according to an embodiment of the present invention.

As shown in FIG. 5, the display device 10 includes a monitor control circuit 11 (monitor control unit), a USB Type-C controller 12 (second control unit), a liquid crystal panel 13, and a power lamp 14 including LEDs, a voltage detection circuit 15, an LED control circuit 16, and a USB Type-C connector (predetermined connector).

The display device 10 in the present embodiment is characterized by being implemented with a function of informing the user that, for example, the monitor cannot be started because the external device is less than 45 W (i.e., does not support 20V), so that the power of 45 W or more cannot be supplied via the VBUS line by USB Type C negotiation, as in the above-described external device 20b.

Here, since the display device 10 is dedicated for USES Type-C PD power reception, an AC code is not used, and the monitor does not have a power supply board.

Further, the display device 10 uses a conventional power lamp (LED) as it is, enters the conventional power save mode when a USB Type-C source device is connected, and is powered on when the negotiation is established. That is, for example, the power lamp "lights in red" (standby mode) when the source device is connected, "lights in blue" when negotiation is established (power is turned on and a screen image of the monitor is started), and is "blinking in red" (display indicating power shortage of the source device) when negotiation is not established.

That is, the power lamp 14 is arranged as shown in the display device 10 shown on the upper side of FIG. 5, and the establishment/non-establishment of negotiation is displayed by the power lamp 14 to notify the user.

Additionally, since the USB Type-C controller 12 turns off SW-A (which is not turned on), the power VBUS OUT is not supplied to the monitor control circuit 11.

Therefore, a detector (voltage detection circuit 15) shown on the lower side of FIG. 5 is provided, which turns on a switch SW-B so as to supply VBUS 5V (VBUS STANBY) to the monitor control unit (monitor control circuit 11) and control the power lamp 14 (LEDs).

In the display device 10, not only the USB Type-C controller 12 supplies the voltage of VBUS IN to the monitor control circuit 11, but also the voltage detection circuit 15 is provided, and when the USB Type-C PD does not support 20V (when negotiation is not established), the voltage detection circuit 15 detects the voltage of VBUS IN based on MIN 18.5V (MIN standard value is 19V) according to the USB Type-C PD standard, and leaves the switch SW-B on.

Therefore, in order to keep constant (5V) the voltages of 5V OUT (reference voltage) and VBUS STANBY, a step-down DC-DC converter is provided in the voltage detection circuit 15, and when it is detected that the voltage of VBUS IN is 18.5V or less, VBUS STANBY is additionally supplied to the monitor control circuit 11 and the LED control circuit 16 so as to cause the monitor (display device 10) to operate in the standby mode.

The voltage of VBUS IN is 5V when the source device (external device) is connected to the monitor (display device 10), but after negotiation, becomes 9V, 15V, 20V and does not become 5V as in the standby mode.

In addition, a voltage other than 20V is specified after negotiation, but if the source device does not support the specified voltage, the switch SW-A is turned off so that the power of VBUS OUT is not supplied to a control system board (monitor control circuit 11) of the monitor (display device 10). Therefore, the DC-DC converter supplies a stable voltage of 5V to a main board side (power lamp 14) so as to cause the monitor (display device 10) to operate in the STANBY mode.

Further, the switch SW-B is turned on before negotiation and when the negotiation is not established, so that the power of VBUS STANBY is supplied to the main board (power lamp 14) and the LED control circuit 16 of the monitor.

Further, a voltage comparison comparator 15c is provided in order to turn on the switch SW-B, and when the voltage of VBUS IN becomes 18.5V or less, the switch SW-B is turned on by a signal from the comparator.

Figure 6:
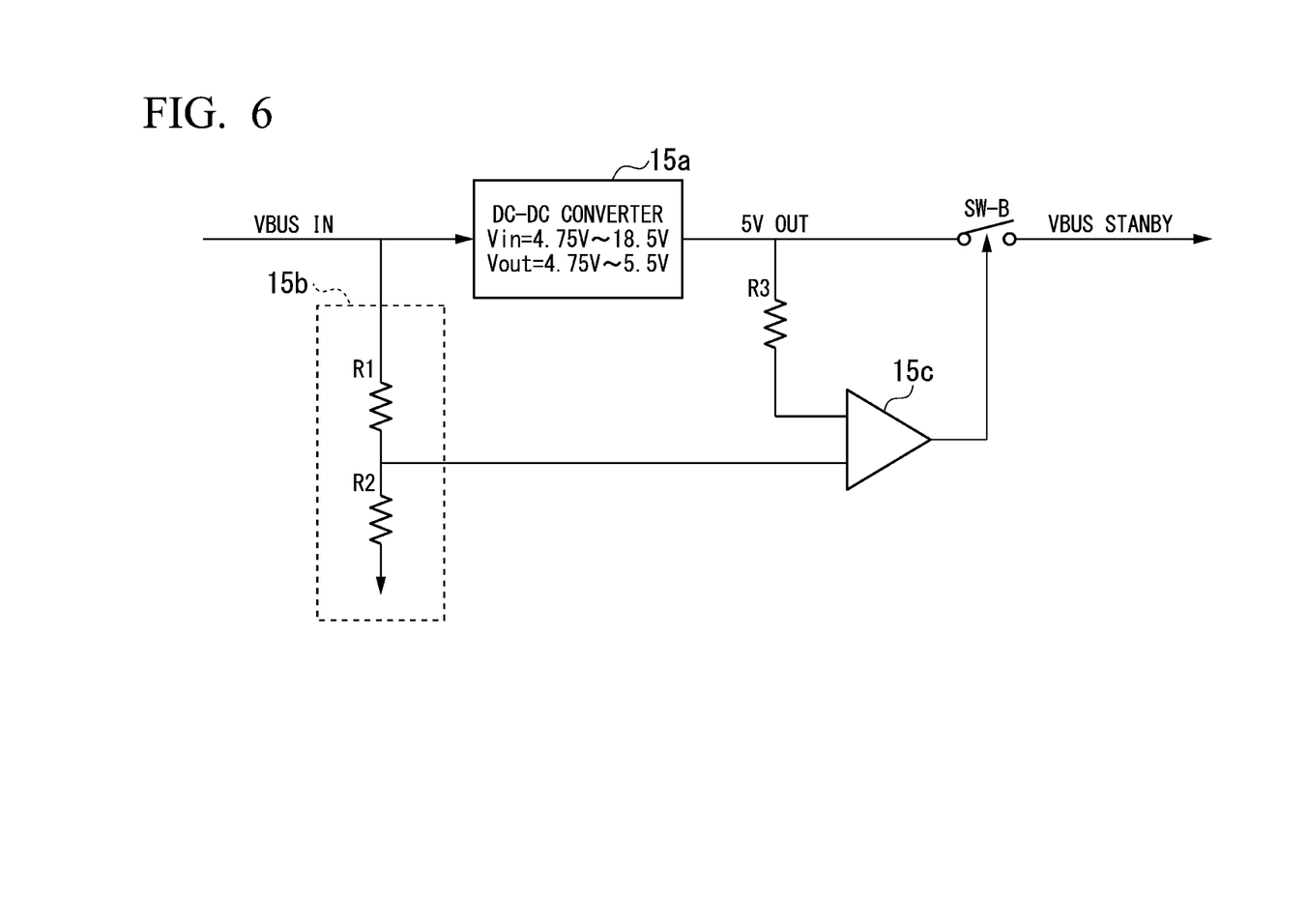
FIG. 6 is a block diagram showing a configuration example of a voltage detection circuit 15.

Here, a configuration of the voltage detection circuit 15 will be described with reference to FIG. 6. FIG. 6 is a block diagram showing a configuration example of the voltage detection circuit 15.

The voltage detection circuit includes a DC-DC converter 15a, a resistance voltage divider circuit 15b, and the voltage comparison comparator 15c.

The DC-DC converter 15a converts a voltage value (Vin=4.75V to 18.5V) of the power supplied from the external device via the USB Type-C connector (predetermined connector) to output Vout=4.75V to 5.5V and generate 5V OUT (reference voltage).

The resistance voltage divider circuit 15b divides, in proportion to the resistances, the voltage value of the power supplied from the external device via the predetermined connector to generate a voltage corresponding to 5V OUT (reference voltage). That is, when VBUS IN=18.5V (predetermined voltage) is inputted, the voltage value of VBUS IN is divided in proportion to the resistances, so that an output voltage corresponding to 5V OUT (reference voltage) becomes 5V OUT (reference voltage).

The voltage comparison comparator 15c compares the voltage corresponding to 5V OUT (reference voltage) with 5V OUT (reference voltage), and when the voltage corresponding to 5V OUT (reference voltage) becomes 5V OUT (reference voltage) or less, outputs an output signal indicating a state in which the switch SW-B (second switch) is turned on.

Returning to FIG. 5, the configuration of the display device 10 will be described.

The monitor control circuit 11 (control unit) controls the display of the liquid crystal panel 13 based on the power supplied from the external device, and controls the lighting of the power lamp 14 based on the reference voltage.

The switch SW-A (first switch) supplies the power to the monitor control circuit 11 (control unit), the power being supplied from the external device via the USB Type-C connector (predetermined connector).

The voltage detection circuit 15 generates the reference voltage.

The switch SW-B (second switch) supplies the reference voltage to the power lamp 14 and the monitor control circuit 11 (control unit).

The USB Type-C controller 12 (second control unit) determines whether or not the power supplied from the external device via the predetermined connector meets the condition for establishing negotiation with the external device, and according to a result of the determination, turns on one of the switch SWA (first switch) and the switch SWB (second switch).

Figure 7:
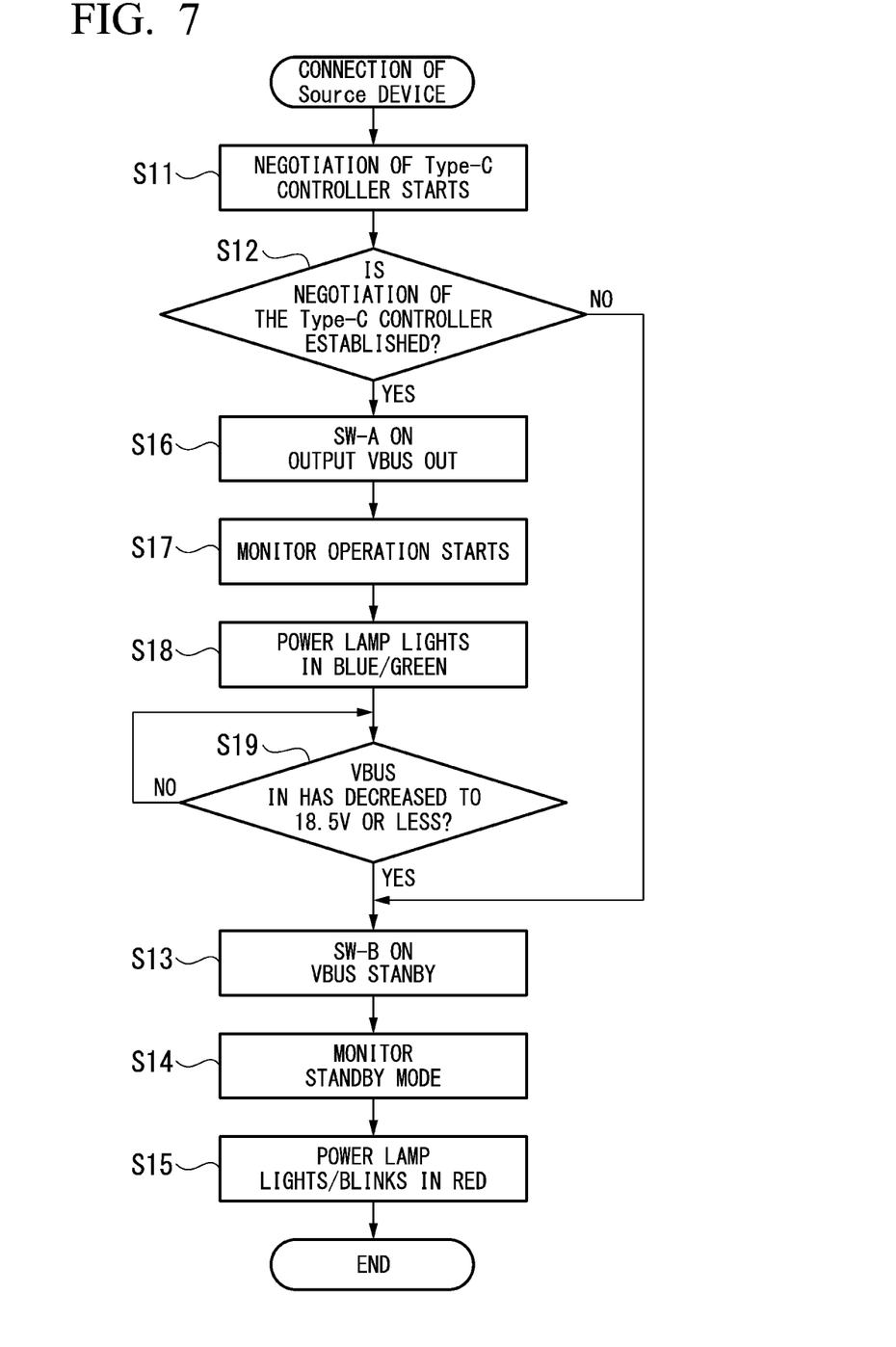
FIG. 7 is a flowchart showing an operation example of the display device 10 according to an embodiment of the present invention.

Next, an operation example of the display device 10 connected to the external devices 20a to 20c (here, referred to as the external device 20x, as needed) will be described with reference to the drawings.

FIG. 7 is a flowchart showing an operation example of the display device 10 according to the embodiment of the present invention.

When the source device is connected, negotiation of the Type-C controller starts (step S11).

Specifically, when the external device 20x and the display device 10 are connected, negotiation of the Type-C controller 12 in the display device 10 with the external device 20x starts.

The Type-C controller determines whether or not the negotiation has been established (step S12). Here, the condition for establishing the negotiation is that the external device 20x can supply the voltage of 20V and can supply the power of 45 W to 100 W.

Therefore, if a result of the determination at this step is No (step S12-No), the display device 10 connected to the external devices 20a and 20b proceeds to step S13, and if Yes (step S12-Yes), the display device 10 connected to the device 20c proceeds to step S16.

SW-B is turned on, and VBUS STANBY is outputted (step S13).

Specifically, if the power supplied from the external devices 20a and 20b via the USB Type-C connector (predetermined connector) does not meet the condition for establishing the negotiation with the external devices 20a and 20b, the voltage comparison comparator 15c in the voltage detection circuit 15 outputs an output signal indicating the state in which the switch SW-B (second switch) is turned on, so that the Type-C controller 12 (second control unit) detects the output signal to turn on the switch SW-B (second switch) and supply 5V OUT (reference voltage) to the power lamp 14 and the monitor control circuit 11 (control unit). Here, the reason that the voltage comparison comparator 15c in the voltage detection circuit 15 outputs the output signal indicating the state in which the switch SW-B (second switch) is turned on is that the voltage of VBUS IN inputted to the resistance voltage divider circuit 15b in the voltage detection circuit 15 is lower than the predetermined voltage=18.5 V.

The monitor is caused to enter the standby mode (step S14).

Specifically, the monitor control circuit 11 (control unit) shifts the display device to the standby mode and controls the LED control circuit 16 to supply 5V OUT (reference voltage) to the power lamp 14.

The power lamp lights/blinks in red (step S15).

Specifically, the power lamp 14 lights to indicate that the display device is in the standby mode.

SW-A is turned on and VBUS STANBY is outputted (step S16).

Specifically, if the power supplied from the external device 20c via the USB Type-C connector (predetermined connector) meets the condition for establishing the negotiation with the external device 20c, the Type-C controller 12 (second control unit) turns on the switch SW-A (first switch) to supply to the monitor control circuit 11 (control unit), the power supplied from the external device 20c via the USB Type-C connector (predetermined connector).

The monitor operation starts (step S17).

Specifically, the monitor control circuit 11 (control unit) shifts the display device to a normal mode in which the liquid crystal panel 13 in the display device displays a video signal, and controls the LED control circuit 16 to supply to the power lamp 14, a voltage corresponding to when the display device is in the normal mode.

The power lamp lights in blue/green (step S18).

Specifically, the power lamp 14 lights to indicate that the display device is in the normal mode.

It is determined whether or not VBUS IN has decreased to 18.5V or less (step S19).

Specifically, if VBUS IN inputted to the resistance voltage divider circuit 15b in the voltage detection circuit 15 becomes VBUS IN≤18.5V (predetermined voltage), the voltage comparison comparator 15c in the voltage detection circuit 15 outputs an output signal indicating the state in which the switch SW-B (second switch) is turned on (step S19-Yes). On the other hand, if VBUS IN inputted to the resistance voltage divider circuit 15b in the voltage detection circuit 15 is VBUS IN>18.5V (predetermined voltage), the voltage comparison comparator 15c in the voltage detection circuit 15 does not output the output signal indicating the state in which the switch SW-B (second switch) is turned on (step S19-No).

Then, if No at step S19, this determination process is repeated, and when Yes at step S19, the process proceeds to step S13.

According to the display device 10 of the present embodiment, it is possible to achieve the following improvements as compared to the conventional display devices 10a to 10c.
(A) In the case where the USB device (source device) that is the external device is a USB 1.0/2.0/3.0 device (for example, external devices 20a and 20b), the USB VBUS output cannot be 45 W, so that the user can determine an error in specification of the USB device (source device).
(B) In the case where the USB device (source device) which is the external device is a device with insufficient power to supply (for example, external devices 20a, 20b, 20c), it is possible to determine from the display of the power lamp 14 that the monitor (display device 10) is not abnormal.
(C) In the case where the USB device (source device) that is the external device is the external device 20c, when the VBUS voltage becomes, for example, 1.9V or less which is the standard voltage value (MIN) of the USB Type-C PD, due to a failure of the external device 20c, a decrease in the battery or the like, it is possible to shift the monitor (display device 10) to the standby mode.
(D) In the case where the USB device (source device) which is the external device is the external device 20c, the user can determine from the display of the power lamp 14, a failure of the external device 20c or a deterioration state of the battery or the like.

As a result, according to one aspect of the present invention, when a screen does not appear due to a defect on the power supply side (external devices 20a, 20b, 20c which are the source devices), it is possible to identify the power reception abnormality of the USB PD (power delivery) on the monitor (display device 10 which is the sink device).

Figure 8:
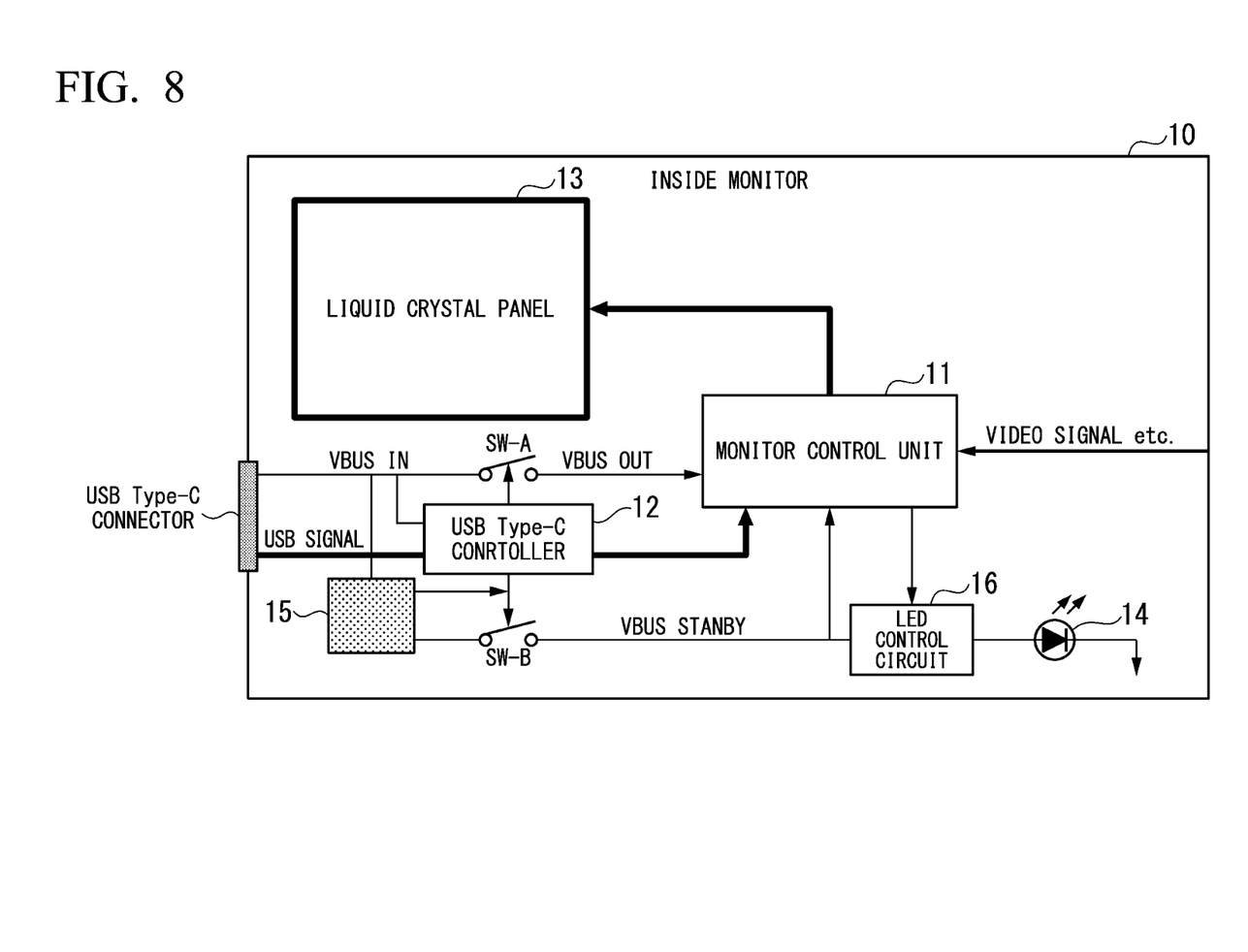
FIG. 8 is a block diagram showing a basic configuration example of the display device according to an embodiment of the present invention.

Next, a basic configuration example of the embodiment of the present invention will be described with reference to FIG. 8. FIG. 8 is a block diagram showing the basic configuration example of the image display device according to the embodiment of the present invention.

The display device 10 shown in FIG. 8 is a display device having the liquid crystal panel 13 and the power lamp 14, and includes the monitor control circuit 11 (control unit), the switch SW-A (first switch), and the voltage detection circuit 15, the switch SW-B (second switch), and the USB Type-C controller 12 (second control unit).

The monitor control circuit 11 (control unit) controls the display of the liquid crystal panel 13 based on the power supplied from the external device, and controls the lighting of the power lamp 14 based on the reference voltage.

The switch SW-A (first switch) supplies the power to the monitor control circuit 11 (control unit), the power being supplied from the external device via the USB Type-C connector (predetermined connector).

The voltage detection circuit 15 generates the reference voltage.

The switch SW-B (second switch) supplies the reference voltage to the power lamp 14 and the monitor control circuit 11 (control unit).

The USB Type-C controller 12 (second control unit) determines whether or not the power supplied from the external device via the USB Type-C connector (predetermined connector) meets the condition for establishing negotiation with the external device, and according to a result of the determination, turns on one of the switch SW-A (first switch) and the switch SW-B (second switch).

According to the above-described minimum configuration of the embodiment of the present invention, when a screen does not appear due to a defect on the power supply side (external device which is the source device), it is possible to identify the power reception abnormality of the USB PD (power delivery) on the monitor (display device 10 which is the sink device).

Although the embodiments of the present invention have been described above with reference to the drawings, the specific configuration is not limited to the above embodiments, and includes designs and the like within a range that does not deviate from the gist of the present invention.

For example, a program for realizing the functions of the monitor control circuit 11 (control unit) and the USB Type-C controller 12 (second control unit) shown in FIG. 5 may be recorded on a computer-readable recording medium, so that the control process may be performed by causing a computer system to load the program recorded on the recording medium and execute the program. Here, the term "computer system" as used herein includes hardware such as an OS and peripheral devices. Further, the "computer system" includes a homepage providing environment (or a display environment) if a WWW system is used. Further, the "computer-readable recording medium" refers to a portable medium such as a flexible disk, a magneto-optical disk, a ROM, or a CD-ROM, or a storage device such as a hard disk built in a computer system. Furthermore, a "computer-readable recording medium" includes those that hold a program for a certain period of time, such as a volatile memory (RAM) inside a computer system that serves as a server or client when the program is transmitted via a network such as the Internet or a communication line such as a telephone line. In addition, the above-described program may be a program for realizing a part of the above-described functions, and may be a program for realizing the above-described functions in combination with a program already recorded in the computer system.

DESCRIPTION OF REFERENCE NUMERALS 10, 10a, 10b, 10c, 10x . . . display device, 13 . . . liquid crystal panel, 13a, 13b, 13c . . . panel, 14 . . . power lamp, 11 . . . monitor control circuit (control unit), 11a, 11b, 11c . . . monitor control unit, 12 . . . USB Type-C controller (second control unit), 12a, 12b, 12c . . . USB Type-C controller IC, 15 . . . voltage detection circuit, 15a . . . DC-DC converter, 15b . . . resistance voltage divider circuit, 15c . . . voltage comparison comparator, 20a, 20b, 20c, 20x . . . external device

The invention claimed is:

1. A display device having a liquid crystal panel and a power lamp, the display device comprising:
   a controller that controls a display of the liquid crystal panel based on a power supplied from an external device and controls a lighting of the power lamp based on a reference voltage;
   a first switch that supplies the power to the controller, the power being supplied from the external device via a predetermined connector:
   a voltage detection circuit that generates the reference voltage;
   a second switch that supplies the reference voltage to the power lamp and the controller; and
   a second controller that determines whether or not the power meets a condition for establishing negotiation with the external device, and turns on one of the first switch and the second switch according to a result of the determination.

2. The display device according to claim 1, wherein
   if the power does not meet the condition for establishing the negotiation with the external device, the second controller turns on the second switch,
   the controller shifts the display device to a standby mode and controls an LED control circuit to supply the reference voltage to the power lamp, and
   the power lamp lights to indicate that the display device is in the standby mode.

3. The display device according to claim 1, wherein
   if the power meets the condition for establishing the negotiation with the external device, the second controller turns on the first switch,
   the controller shifts the display device to a normal mode in which the liquid crystal panel in the display device displays a video signal, and controls an LED control circuit to supply to the power lamp, a voltage corresponding to when the display device is in the normal mode, and
   the power lamp lights to indicate that the display device is in the normal mode.

4. The display device according to claim 1, wherein
   the voltage detection circuit compromises a circuit comprising:
   a DC-DC converter that converts a voltage value of the power supplied from the external device via the predetermined connector to generate the reference voltage;
   a resistance voltage divider circuit that generates a voltage corresponding to the reference voltage by dividing, in proportion to resistances, the voltage value of the power supplied from the external device via the predetermined connector; and
   a voltage comparison comparator that compares the reference voltage with the voltage corresponding to the reference voltage, and when the voltage corresponding to the reference voltage becomes equal to or lower than the reference voltage, outputs an output signal indicating a state in which the second switch is turned on.

5. The display device according to claim 4, wherein
   the second controller detects the output signal indicating-the-state in which the and turns on the second switch.

6. The display device according to claim 1, wherein
   after the power lamp lights to indicate that the display device is in the normal mode, the second controller detects the output signal and turns on the second switch.

7. The display device according to claim 1, wherein
   the external device includes a battery and an AC adapter that supplies a power to the battery,
   the external device supplies the power charged in the battery to the display device, and
   the second controller turns on the second switch when the external device supplies the power to the display device via a connector different from the predetermined connector in the display device, or when the external device supplies the power to the display device via a connector identical to the predetermined connector in the display device, and the power does not meet the condition for establishing the negotiation with the external device.

8. The display device according to claim 1, wherein
   the external device includes a battery and an AC adapter that supplies a power to the battery,
   the external device supplies the power charged in the battery to the display device, and
   the second controller turns on the first switch when the external device supplies the power to the display device via a connector identical to the predetermined connector in the display device, and the power meets the condition for establishing the negotiation with the external device.

9. The display device according to claim 1, wherein
   the predetermined connector comprises a USB Type-C connector.

10. A power supply method of a display device having a liquid crystal panel and a power lamp, the display device comprising:
    a controller that controls a display of the liquid crystal panel based on a power supplied from an external device and controls a lighting of the power lamp based on a reference voltage;
    a first switch that supplies the power to the controller, the power being supplied from the external device via a predetermined connector;
    a voltage detection circuit that generates the reference voltage;

a second switch that supplies the reference voltage to the power lamp and the controller; and a second controller, wherein the second controller determines whether or not the power meets a condition for establishing negotiation with the external device, and turns on one of the first switch and the second switch according to a result of the determination.

\* \* \* \* \*